May 7, 1946.    L. BARDOS    2,399,977
METAL DISINTEGRATING DEVICE
Filed April 7, 1944
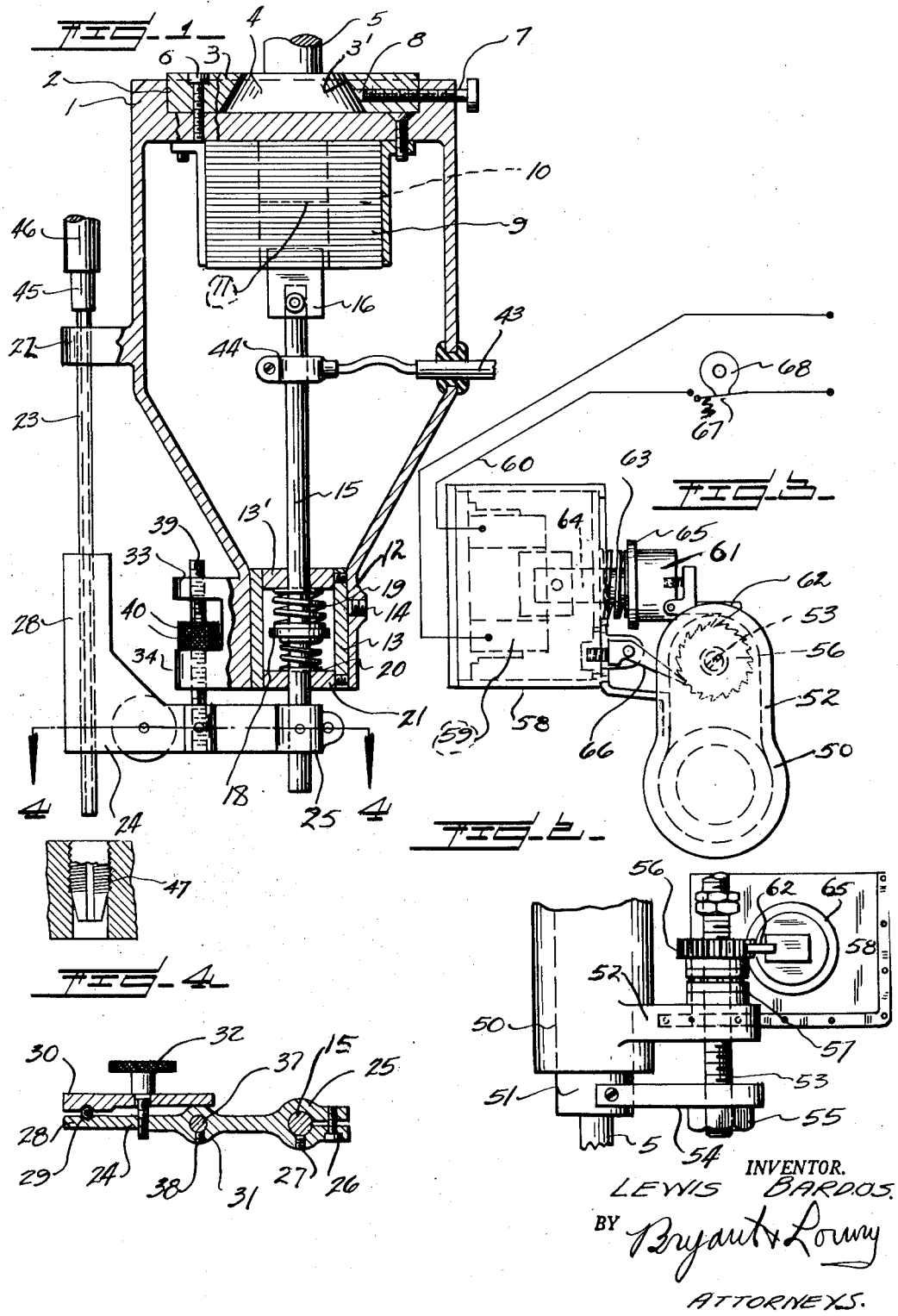
INVENTOR.
LEWIS BARDOS.
BY Bryant & Lowry
ATTORNEYS.

Patented May 7, 1946

2,399,977

UNITED STATES PATENT OFFICE 2,399,977

METAL DISINTEGRATING DEVICE

Lewis Bardos, River Rouge, Mich.

Application April 7, 1944, Serial No. 530,029

6 Claims. (Cl. 219—15)

The present invention pertains to a novel metal disintegrating device and resides in improvements in the apparatus shown in my co-pending application, Serial No. 517,135, filed January 5, 1944. One of the uses of the device is to remove broken taps from work.

The device embodies an electrode that is caused to vibrate against the work. The whole apparatus is conveniently mounted in the chuck of a drill press. In the earlier application the electrode is co-axial with the chuck. One of the objects of the present invention is to mount the electrode in a position that permits better access into corners and near flanges or walls.

This object is accomplished by mounting the electrode in an offset relation to the axis of the chuck. A laterally extending clamp is provided for this purpose. Associated with the clamp is a mechanism that prevents the clamp from swinging and also guides it and the electrode in a true rectilinear path.

The invention also embodies a spring system affording proper cushioning of the vibrations and yet sufficiently flexible to permit erratic oscillations of the electrode. Such oscillations occur in the operation of the device and have a desirable effect on the disintegration of the metal.

The electrode is tubular to permit flow of a coolant, and the invention permits the use of an inexpensive fabricated tubing for this purpose.

The invention is fully disclosed by way of example in the following description and in the accompanying drawing in which Figure 1 is a vertical section of the device, partly in elevation;

Figure 2 is a detail elevation;

Figure 3 is a corresponding plan view;

Figure 4 is a section on the line 4—4 of Figure 1.

Reference to these views will now be made by use of like characters which are employed to designate corresponding parts throughout.

The device comprises a suitably shaped housing 1 having an open top 2 into which is seated a ring 3. The ring has a conical recess 3' in which is seated, before completing the assembly, a conical fiber plug 4 having a rod 5 extending upwardly therefrom. The rod is adapted for insertion into the chuck of a drill press or similar machine. The ring 3 is finally assembled by screws 6, and the plug 4 is locked by a set screw 7 bearing against a brass seating plug 8.

Within the housing 1 is mounted an electromagnet comprising a laminated core 9 and windings 10. A recess 11 is maintained in the bottom of the magnet for accommodating an armature, as will presently be described.

The bottom of the housing 1 tapers to a neck 12 into which is press fitted a non-magnetic cylinder 13 held by a set screw 14. A shaft 15 is passed through the cylinder and carries at its upper end an armature 16 receivable in the recess 11. The shaft is formed with a shoulder 18 within the cylinder, and a compressed spring 19 is seated between the shoulder and the top 13' of the cylinder. A non-magnetic nut 21 is then screwed into the bottom of the cylinder A weaker spring 20 opposing the spring 19 is inserted between the shoulder 18 and the nut 21. This spring is a cushion for the motion of the shaft 15 when released and propelled by the spring 19 on de-energization of the electro-magnet.

A bracket 22 is formed on the housing 1, and through this bracket is slidably passed a capillary tube 23. Such tubing is commercially available on the market at comparatively low cost and is substantially cheaper than tubing that is drilled to order. One of the economies of the invention results from this fact. The commercial tubing is usually copper.

The lower end of the shaft 15, outside the housing 1, carries a laterally extending arm 24 formed at one end as a split ring 25 compressed on the shaft 15 by a screw 26. A set screw 27 may also be passed through the ring and tightened on the shaft. The free or other end of the arm 24 is extended upward as a clamping jaw 28 formed with a vertical V-groove 29 to seat a length of the tubing 23. The complementary jaw 30, similarily grooved, bears against a boss 31 on the arm 24 and is secured to the arm by a screw 32.

On the neck 12 is formed a double bracket 33, 34, in which is slidably mounted a threaded rod 39 having its lower end received in an aperture 37 in the boss 31 and secured therein by a set screw 38. The upper portion of the rod 39 is screwed through a pair of nuts 40 disposed between the parts 33 and 34 of the double bracket.

A flexible conductor 43 passing through the housing 1 is fastened to the shaft 15 by a suitable clip 44. The other side of the circuit is grounded through the work, as will presently appear. On the upper end of the tube 23 is a nipple 45 over which is fitted a flexible tube 46 for supplying a suitable coolant, which may consist of water with an addition of a rust-inhibiting agent. Current to the shaft 15 is supplied, for example, from a transformer at a voltage on the order of 3½ to 10 volts. The electro-magnet takes an alternating current, preferably, of about 110 volts.

In the operation of the device, the opposing action of the electro-magnet and the spring 19 produces a vibration of the shaft 15, in the manner described in my earlier application. This vibration is transmitted to the arm 24 and tube 23. The offset position of the tube from the axis of the housing 1 and the adjustability of the tube permit the latter to reach into corners and against walls or abutments in a manner not possible with the earlier device.

The rod 39 holds the arm 24 from swinging about the shaft 15. The amplitude of the vibration is adjusted by the nuts 40 which, obviously are limited by the clearance between each nut and the adjacent side of the bracket 33, 34. The tube becomes the ultimate electrode and, when supplied with current from the source, disintegrates the piece 47 with which it makes a vibrating contact.

Another function of the springs 19, 20 is that they produce in the tube 23 an erratic oscillation having an irregular frequency and amplitude. This motion is beneficial to the disintegrating action in that it appears to accelerate the release of particles from the work into the stream of coolant.

As the work continues to disintegrate, the apparatus must be advanced correspondingly. This can be done by lowering the drill press chuck in the usual manner. It is preferred, however, to employ the automatic feed shown in Figure 2. The housing 50 enclosing the spindle 51 has a lug 52 in which a feed screw 53 is mounted. A bracket 54 secured to the spindle 51 is fastened to the feed screw by a nut 55. A ratchet 56 is threaded on the screw, with a thrust bearing 57 inserted between the ratchet and the lug 52.

On the housing 50 is mounted another housing 58 in which is contained an electro-magnet 59 supplied with current by conductors 60. The armature 61 of the magnet carries a pawl 62 adapted to actuate the ratchet 56. The magnet is opposed and balanced by a spring 63 mounted on the armature rod 64 between the housing 58 and a collar 65 on the rod. The housing also carries a detent 66 engaging the pawl 56 to prevent slipping thereof.

One of the conductors 60 contains a switch 67 closed at regular intervals by a rotating timer cam 68 driven by a small motor or other suitable means. By this mechanism the ratchet is turned at intervals and the screw 53 and spindle 51 are advanced, likewise advancing the housing 1 and electrode tube 23 against the work.

Although a specific embodiment of the invention has been illustrated and described, it will be understood that various alterations in the details of construction may be made without departing from the scope of the invention as indicated by the appended claims.

What I claim is:

1. A disintegrator for metal comprising a housing, a shaft slidably mounted therein and extending through a wall thereof, an arm extending laterally from the outer end of said shaft, a clamp carried by said arm and disposed externally of said housing, a tubular electrode of uniform outside diameter received in said clamp and having its ends disposed externally beyond the ends of said clamp, said electrode being open at both ends and slidably adjustable in said clamp, one end of said electrode being adapted for connection to a fluid coupling, means for delivering current to said electrode, and means for vibrating said shaft.

2. A disintegrator for metal comprising a housing, a shaft slidably mounted therein and extending through a wall thereof, an arm extending laterally from the outer end of said shaft, a clamp carried by said arm and disposed externally of said housing, a tubular electrode of uniform outside diameter received in said clamp and having its ends disposed externally beyond the ends of said clamp, said electrode being open at both ends and slidably adjustable in said clamp, one end of said electrode being adapted for connection to a fluid coupling, means for delivering current to said electrode, and means for vibrating said shaft, a bracket extending from said housing and a guide rod extending from an intermediate point of said arm and slidably received in said bracket.

3. A disintegrator for metal comprising a housing, a shaft slidably mounted therein and extending through a wall thereof, an arm extending from the outer end of said shaft, an electrode carried by said arm, means for delivering current to said electrode, a vibratory solenoid carried by said housing, an armature carried by said shaft and disposed in the field of said solenoid, a bracket extending from said housing, a guide rod extending from an intermediate point of said arm and slidably received in said bracket, and an adjustable stop on said rod and engaging said bracket for determining the initial position of said armature in said field.

4. A disintegrator for metal comprising a housing, a shaft slidably mounted therein and extending through a wall thereof, an arm extending laterally from the outer end of said shaft, a clamp carried by said arm and disposed externally of said housing, a tubular electrode of uniform outside diameter received in said clamp and having its ends disposed externally beyond the ends of said clamp, said electrode being open at both ends and slidably adjustable in said clamp, one end of said electrode being adapted for connection to a fluid coupling, means for delivering current to said electrode, and means for vibrating said shaft.

5. A disintegrator for metal comprising a housing, a shaft slidably mounted thereon and extending through a wall thereof, an arm extending laterally from the outer portion of said shaft, a tubular electrode carried by said arm externally of said housing, an electro-magnetic vibrator for vibrating said shaft, separate current sources for said vibrator and electrode, said electrode being open at both ends, and a fluid coupling connected to the upper end of said electrode and independent of said vibrator.

6. A disintegrator for metal comprising a housing, a shaft slidably mounted thereon and extending through a wall thereof, an arm extending laterally from the outer portion of said shaft, a tubular electrode carried by said arm externally of said housing, an electro-magnetic vibrator for vibrating said shaft, a clamp carried by said arm and adapted to receive a substantial length of said electrode, said electrode being of uniform internal and external diameters and open at both ends, a fluid coupling on the upper end of said electrode, separate current sources for said vibrator and electrode, said electrode being open at both ends, and a fluid coupling connected to the upper end of said electrode and independent of said vibrator.

LEWIS BARDOS.